United States Patent [19]

Ohta et al.

[11] 4,397,912

[45] Aug. 9, 1983

[54] GARNET FILM FOR MAGNETIC BUBBLE ELEMENT

[75] Inventors: Norio Ohta, Sayama; Keikichi Ando, Musashino; Yuzuru Hosoe, Kokubunji; Yutaka Sugita, Tokorozawa, all of Japan

[73] Assignee: Hitachi, Ltd., Tokyo, Japan

[21] Appl. No.: 278,700

[22] Filed: Jun. 29, 1981

[30] Foreign Application Priority Data

Jun. 27, 1980 [JP] Japan .................................. 55-86625

[51] Int. Cl.³ .......................... G11B 5/64; B01N 17/00

[52] U.S. Cl. ................................. 428/336; 252/62.57; 252/62.59; 252/62.6; 428/692; 428/693; 428/900; 428/910

[58] Field of Search ..................... 252/62.57; 428/692, 428/900, 336

[56] References Cited

U.S. PATENT DOCUMENTS

| | | | |
|---|---|---|---|
| 3,995,093 | 11/1976 | Heinz | 252/62.57 |
| 4,183,999 | 1/1980 | Ota et al. | 428/336 |
| 4,239,805 | 12/1980 | Jonker | 428/446 |
| 4,267,230 | 5/1981 | Ohta et al. | 428/692 |
| 4,322,454 | 3/1982 | Challeton et al. | 427/128 |
| 4,338,372 | 7/1982 | Ohta et al. | 428/336 |

FOREIGN PATENT DOCUMENTS

| | | | |
|---|---|---|---|
| 2745266 | 4/1978 | Fed. Rep. of Germany | 252/62.57 |
| 55-62714 | 5/1980 | Japan | 252/62.57 |

*Primary Examiner*—Marion McCamish
*Assistant Examiner*—P. R. Schwartz
*Attorney, Agent, or Firm*—Antonelli, Terry & Wands

[57] ABSTRACT

Herein disclosed is a magnetic garnet film for a magnetic bubble element, in which the temperature changing rate of a bubble collapse field is reduced by Gd and Ga and in which the operating characteristics of the bubbles are improved by La and Lu. The temperature coefficient of the bubble collapse field is −0.24 to 0%/° C., and the operating characteristics are remarkably excellent, therefore, this garnet film is suitable for the small bubbles with a diameter smaller than or equal to 1 μm.

3 Claims, 1 Drawing Figure

GARNET FILM FOR MAGNETIC BUBBLE ELEMENT

BACKGROUND OF THE INVENTION

1. Field of the Invention

The present invention relates to a garnet film for magnetic bubbles, which is suitable as a magnetic bubble holding film in a magnetic bubble memory element.

2. Description of the Prior Art

As is well known in the art, a magnetic bubble memory element has attracted the attention as a promising information processing element, especially, as a memory element and has been actively developed. In case the magnetic bubble memory element is used as the memory element, it is the diameter (d) of the magnetic bubbles that determines the memory density which is the most important factor of the function of the memory element.

At the present stage, magnetic bubbles having a diameter of about 3 to 5 $\mu$m are generally used. If the diameter can be made equal to or smaller than 2.5 $\mu$m, for example, it is possible to drastically increase the memory density.

Specifically, in order that the magnetic bubbles may be practised in the memory element in place of the other memory element such as the disc memory or a semiconductor memory being generally used at present, their diameter has to be so remarkably reduced that the memory density may be drastically enhanced. For that requirement, a magnetic garnet film, in which the bubbles with small diameter can stably exist and operate with satisfactory operating characteristics, has to be found out. However, the magnetic garnet film for the so-called "small bubbles" having a diameter equal to or less than 2.5 $\mu$m is known to generally have a large temperature change of a bubble collapse field $H_o$.

For example, in the case of a $(YSmLu)_3(FeGa)_5O_{12}$ film which can support bubbles having a diameter of about 2 $\mu$m, the temperature coefficient of $H_o$ at 30° C. is $-0.30$ to $-0.35\%/°C$.

On the other hand, the temperature coefficient of the bias magnetic field produced by a barium ferrite magnet, which is conventionally used as a bias magnet, is $-0.20\%/°C$. so that a considerable difference exists between $H_o$ and a bias field.

If the temperature variation of $H_o$ in the bubble film is different from the temperature variation of the aforementioned bias magnetic field, the temperature range within which the bubbles can stably operate is remarkably narrowed. It is therefore apparent that such large difference is not favorable in the magnetic bubble memory element.

On the other hand, if the diameter of bubbles becomes remarkably small, the saturation magnetic flux density $4\pi M_s$ becomes remarkably large thereby to make it difficult to operate the small bubbles stably at a high speed.

The following references, for example, are known as to the temperature characteristics of the garnet film for the magnetic bubble memory element:

(1) R. M. Sandfort, et al., "Temperature variation of Magnetic Bubble garnet film parameters", AIP Conf. Proc. 18, (1), p 237 to 214 (1973);

(2) G. G. Summer, et al., "Growth Reproducibility and Temperature Dependencies of the Static Properties of YSmLuCaFeGe Garnet", AIP Conf. Proc. 34, p 157 to 159 (1776); and (3) Jerry W. Meody, et al., "Properties of $Gd_yY_{3-y}Fe_{5-x}Ga_xO_{12}$ films grown by LPE", IEEE transactions on magnetics, Vol. May. 9, 377 (1973).

The above-identified reference (1) discloses the temperature characteristics of the garnet film for the magnetic bubble element but neither has a description relating to the improvement in the temperature characteristics of $H_o$ of the garnet film for the fine bubbles nor disclosed the composition of the present invention.

The above-identified reference (2) disclosed the YSmLuCaFeGe garnet as a material having a temperature coefficient of $H_o$ of $-0.2\%/°C$., but this is the Ca-Ge garnet which has an absolutely different composition from that of the present invention and which has its control of $H_o$ impossible so that the value of $H_o$ cannot be made the most suitable for the bias magnet used.

The above-identified reference (3) discloses a garnet containing Gd and Ga but made absolutely different from the present invention in the composition such that the ratios of Gd and Ga are different and such that Sm and Lu are not contained. Moreover, the material disclosed is not the garnet for the small bubbles, and there is no disclosure concerning $H_o$.

On the other hand, Japanese Patent Laid-Open No. 55-62714 discloses the garnet film which has such a composition as is expressed by a general formula of $(YSmLu)_{3-x}Gd_xFe_{5-y}Ga_yO_{12}$. The garnet film disclosed is common with the present invention in that Gd and Ga are contained and in that the temperature characteristics of $H_o$ are excellent but finds it very difficult to operate the remarkably small bubbles having a diameter equal to or smaller than 1 $\mu$m with the satisfactory high speed operating characteristics.

SUMMARY OF THE INVENTION

It is, therefore, an object of the present invention to make it possible to form a garnet film for fine magnetic bubbles, which can solve the aforementioned problems concomitant with the garnet film for the magnetic bubbles according to the prior art and which can stably operate within a wide temperature varying range.

Another object of the present invention is to provide a garnet film for magnetic bubbles, which has a temperature changing rate of $H_o$ within a range of $-0.25$ to $0.0\%/°C$.

A further object of the present invention is to provide a garnet film for magnetic bubbles, which can stably hold and operate with high speed operating characteristics the remarkably small bubbles having a diameter equal to or smaller than about 1 $\mu$m.

In order to attain the above-recited objects, according to the present invention, a predetermined quantity of Gd is added to a magnetic garnet film having a composition of $(LaLuSm)_3(FeGa)_5O_{12}$, and the ratio of Gd is reduced partly to reduce the temperature change of $H_o$ and partly to improve the operating characteristics for the small bubbles having a diameter equal to or smaller than 1 $\mu$m.

DETAILED DESCRIPTION OF THE PREFERRED EMBODIMENTS

Figure 1:
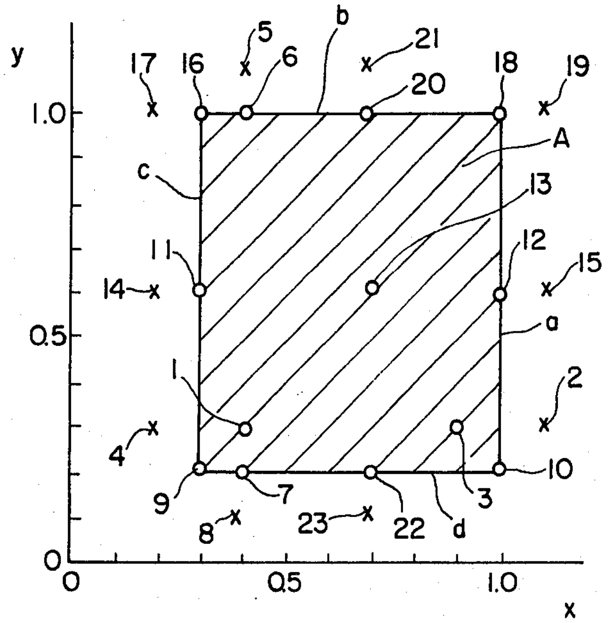
FIG. 1 is a graph illustrating the preferred range of the quantities of Gd and Sm in the garnet single-crystalline film according to the present invention.

As has been described hereinbefore, the temperature coefficient of $H_o$ of $(YSmLu)_3(FeGa)_5O_{12}$ at 30° C. is −0.30 to −0.35%/°C., whereas the temperature coefficient of the bias magnetic field applied by a barium ferrite is −0.20%/°C.

Therefore, if the temperature changing rate of $H_o$ of the garnet film supporting the magnetic bubbles is so lowered that it matches with that of the bias magnetic field, it is possible to fabricate a magnetic bubble memory element which can stably operate within a wide temperature range.

If the temperature coefficient of $H_o$ is made remarkably small and at the same time if a material such as a ferrite is selected so that the temperature coefficient of the bias magnetic field is accordingly reduced, it is possible to fabricate a magnetic bubble memory element which is so remarkably stable as to be little influenced by the temperature variation.

On the other hand, the garnet for the small bubbles according to the prior art, e.g., the above-specified $(YSmLu)_3(FeGa)_3O_{12}$ cannot satisfy the excellent operating characteristics of the bubbles, which raises causes for obstructing the practice of the magnetic bubble memory element for the small bubbles.

In order to solve the problems concomitant with the prior art thus far described, the present invention notices the fact that the temperature coefficient of $H_o$ is dependent upon the temperature variation of the temperature coefficient of the saturation magnetic flux density $4\pi M_s$ and substitutes a portion of a rare earth element and iron by predetermined ratios of Gd and Ga, respectively, thereby to adjust the temperature coefficient of the saturation magnetic flux density so that the temperature coefficient of the bubble collapse field $H_o$ is set at −0.25 to 0%/°C.

At the same time, Lu and La is used in place of Y thereby to improve the high speed operating characteristics so that the satisfactory supporting and prompt transfer margin of the small bubbles having a diameter equal to or smaller than 1 μm is possible.

If the temperature coefficient of $H_o$ becomes larger (in its absolute value) than −0.2%/°C., it is not favorable because it exceeds that of the bias magnetic field, as has been described hereinbefore. On the other hand, if the temperature coefficient of $H_o$ is positive, the temperature dependence of the bubble diameter becomes too large to be used for practices. Therefore, the temperature coefficient of $H_o$ has to be within a range of about −0.25 to 0%/°C.

Nevertheless, it has been found that the temperature coefficient of $H_o$ can be reduced by replacing a portion of the rare earth element by a predetermined ratio of Gd. According to the present invention: the temperature coefficient of $H_o$ is reduced by a proper ratio of Gd; the amount Fe is reduced by Ga; and Y is substituted by Lu and La with a little magnetic loss. As a result, it becomes possible to operate such remarkably small bubbles with the satisfactory operating characteristics as have a diameter equal to or smaller than 1 μm.

The magnetic garnet film according to the present invention can be easily formed on the (111) surface of a single-crystalline substrate of $Gd_3Ga_5O_{12}$ by the usual liquid phase epitaxial growth and has the following many advantages. Specifically, the magnetic garnet film can support the remarkably small magnetic bubbles having a diameter of 0.4 to 1.0 μm and can operate them with the satisfactory characteristics. Since the magnetic garnet film has a high vertical magnetic isotropy so that the intensity of the isotropic magnetic field $H_k$ reaches as high as 1,500 to 3,500 $O_e$, the stability q has to be higher than 1 so as to stably hold and operate the bubbles. In the present invention, nevertheless, the stability is about 2.5 to 5.0 so that the bubbles can be remarkably stably held. The temperature coefficient of the bubble breaking magnetic field $H_o$ is within −0.25 to −0.0%/°C. so that it matches with that of the bias magnetic field $H_B$ applied by the barium ferrite magnet. The magnetic wall mobility $\mu_w$ is so high as to reach 200 cm/sec/$0_e$ so that the high speed operating characteristics are remarkably satisfactory.

The present invention has a general formula, which is expressed by $(LaLu)_{3-x-y}Sm_xGd_yFe_{5-z}Ga_zO_{12}$, as has been described hereinbefore.

For $x<0.3$, the inequality of $q<2.0$ holds at a room temperature, and the inequality of $q<1.0$ holds at 80° C. so that the bubbles cannot stably exist.

For $x>1.0$, on the other hand, since the mobility μw becomes lower than 200 cm/sec/$O_e$ so that the bubbles cannot operate at a high speed (with the drive equal to or higher than 100 KHz), x has to be within a range from 0.3 to 1.0.

For $y<0.2$, the temperature changing rate of $H_o$ becomes equal to or higher than −0.25%/°C., and for $y>1.0$ the value of $H_o$ is abruptly reduced at a low temperature (−40° to 20° C.) so that it becomes unsuitable for the bias magnetic field. Therefore, the value of y has to be within the range from 0.2 to 1.0.

If the value of z exceeds 0.8, the saturation magnetic flux density $4\pi M_s$ becomes equal to or lower than 600 G so that the diameter of the bubbles becomes equal to or larger than 1.0 μm. Therefore, the value of Z has to be equal to or lower than 0.8.

On the other hand, it is sufficient that Lu is contained at a ratio equal to or higher than Sm, and La may be wholly substituted by Lu at the maximum.

EXAMPLE

The characteristics were measured with the ratio x of Sm, the ratio y of Gd, and the ratio Z of Ga being varied in the magnetic garnet film which is expressed by a general formula $(LaLu)_{3-x-y}Sm_xGd_yFe_{5-z}Ga_zO_{12}$, and the results tabulated in Table 1 were obtained. In Table 1, the marks "O" appearing in the judgement columns indicate that the magnetic garnet film is suitable for the small bubbles, whereas the marks "X" indicate that the magnetic garnet film is not suitable, and the reasons for the unsuitableness are presented in the remark columns.

On the other hand, the results of Table 1 are plotted in FIG. 1 while using the ratios x and y as parameters.

In FIG. 1, marks "O" and "X" indicate the propriety and impropriety of the characteristics similarly to Table 1, and the numerals respectively attached to the marks O and X indicate the numbers of samples so that they respectively correspond to the numbers of Table 1.

As is apparent from FIG. 1, if the ratio x of Sm and the ratio y of Gd are within a range A surrounded by segments of lines a, b, c and d, the small bubbles having a diameter not exceeding 1 μm can stably exist so that the temperature coefficient of $H_o$ becomes −0.25 to 0%/°C., and the operating characteristics of the bubbles are excellent.

However, if the ratios x and y are outside of the region A, the aforementioned conditions are not satisfied, and the obstructions presented in the remark columns of Table 1 take place so that the preferable characteristics cannot be attained.

In FIG. 1, more specifically, if the ratios x and y are in the region at the right and side of the line segment a, the mobility $\mu w$ becomes remarkably low thereby to make it difficult for the bubbles to move quickly. On the other hand, if the ratios x and y are in the region above the line segment b, the anisotropy magnetic field $H_k$ becomes remarkably low so that the bubbles become unstable. On the other hand, if the ratios x and y are in the region below the line segment c, the temperature changing rate of $H_0$ becomes large. Any of the above-mentioned cases is unsuitable for the garnet film supporting the small bubbles with the diameter smaller than or equal to 1 $\mu$m.

TABLE 1

| No. | x | y | z | Bubble Dia. d ($\mu$m) | Thickness h ($\mu$m) | Isotropic Mag. Field Hk (Oe) | Satur. Mag. Flux Density $4\pi Ms$ (G) | Mag. Wall Mobility $\mu_w$ (cm/s/Oe) | Temp. Coefficient of $H_0$ (%/°C.) | Judgement | Remarks |
|---|---|---|---|---|---|---|---|---|---|---|---|
| 1 | 0.4 | 0.3 | 0.8 | 1.0 | 0.9 | 1800 | 680 | 500 | −0.24 | O | |
| 2 | 1.1 | 0.3 | 0.8 | 1.0 | 0.7 | 3700 | 710 | 180 | −0.19 | X | $\mu_w$ small |
| 3 | 0.9 | 0.3 | 0.8 | 1.0 | 0.8 | 3200 | 730 | 210 | −0.21 | O | |
| 4 | 0.2 | 0.3 | 0.8 | 0.8 | 0.7 | 1400 | 710 | 750 | −0.26 | X | Hk small (q<2) |
| 5 | 0.4 | 1.1 | 0.5 | 0.9 | 0.8 | 1850 | 700 | 530 | −0.04 | X | Ho excessively small at low tem. |
| 6 | 0.4 | 1.0 | 0.6 | 0.8 | 0.8 | 1880 | 670 | 520 | −0.05 | O | |
| 7 | 0.4 | 0.2 | 0.8 | 0.9 | 0.9 | 1800 | 680 | 500 | −0.25 | O | |
| 8 | 0.4 | 0.1 | 0.8 | 1.0 | 0.9 | 1750 | 720 | 500 | −0.31 | X | Ho high changing rate |
| 9 | 0.3 | 0.2 | 0.8 | 0.9 | 0.8 | 1520 | 750 | 600 | −0.25 | O | |
| 10 | 1.0 | 0.2 | 0.8 | 0.8 | 1.0 | 3350 | 780 | 210 | −0.25 | O | |
| 11 | 0.3 | 0.6 | 0.5 | 0.7 | 0.6 | 1500 | 820 | 650 | −0.16 | O | |
| 12 | 1.0 | 0.6 | 0.5 | 1.0 | 1.0 | 3050 | 840 | 230 | −0.18 | O | |
| 13 | 0.7 | 0.6 | 0.5 | 0.9 | 0.8 | 2550 | 860 | 310 | −0.21 | O | |
| 14 | 0.2 | 0.6 | 0.5 | 0.6 | 0.7 | 1310 | 900 | 810 | −0.25 | X | Hk excessively small |
| 15 | 1.1 | 0.6 | 0.6 | 1.0 | 1.1 | 3000 | 730 | 180 | −0.24 | X | $\mu_w$ excessively small |
| 16 | 0.3 | 1.0 | 0.4 | 0.9 | 0.8 | 1500 | 750 | 550 | −0.08 | O | |
| 17 | 0.2 | 1.0 | 0.4 | 0.6 | 0.7 | 1100 | 760 | 820 | −0.05 | X | Hk excessively small |
| 18 | 1.0 | 1.0 | 0.2 | 0.7 | 0.8 | 3050 | 1200 | 200 | −0.09 | O | |
| 19 | 1.1 | 1.0 | 0.2 | 0.8 | 0.9 | 2950 | 1180 | 160 | −0.11 | X | $\mu_w$ small |
| 20 | 0.7 | 1.0 | 0.4 | 0.6 | 0.7 | 2100 | 980 | 230 | −0.06 | O | |
| 21 | 0.7 | 1.1 | 0.4 | 0.7 | 0.7 | 2150 | 1020 | 220 | −0.02 | X | Ho excessively small at low temp. |
| 22 | 0.7 | 0.2 | 0.8 | 1.0 | 1.0 | 2810 | 700 | 250 | −0.25 | O | |
| 23 | 0.7 | 1.0 | 0.8 | 1.0 | 1.0 | 2950 | 730 | 250 | −0.29 | X | Ho high temp. coefficient |
| 24 | 0.4 | 0.3 | 0.8 | 1.0 | 1.0 | 1800 | 630 | 500 | −0.24 | O | |
| 25 | 0.3 | 0.3 | 0.8 | 1.0 | 1.0 | 1710 | 610 | 520 | −0.25 | O | |
| 26 | 0.4 | 0.3 | 1.1 | 1.2 | 1.2 | 1730 | 550 | 480 | −0.21 | X | large bubble dia. |
| 27 | 0.3 | 0.3 | 1.2 | 1.7 | 1.5 | 1520 | 310 | 730 | −0.20 | X | large bubble dia. |
| 28 | 0.3 | 0.3 | 1.3 | 3.5 | 2.8 | 1810 | 180 | 820 | −0.11 | X | large bubble dia. |

The magnetic garnet film according to the present invention can be formed on the (111) surface of the single-crystalline substrate of $Gd_3Ga_5O_{12}$ (i.e., G.G.G.) by the usual liquid phase epitaxial growth, and one example of the fabricating method thereof will be presented as follows.

Materials of oxides ($La_2O_3$, $Lu_2O_3$, $Sm_2O_3$, $Gd_2O_3$, $Fe_2O_3$, $Ga_2O_3$, PbO and $B_2O_3$) are put in predetermined quantities into a platinum crusible and mixed together. Then, the mixture is heated at 1200° C. for 12 hours to make a uniformly molten liquid.

The temperature is lowered at a rate of 50° to 100° C./h to a temperature range which is higher 5° to 10° C. than the saturation temperature (about 930° C.).

After the molten liquid is stirred at 60 rpm for 30 minutes by means of a platinum jig, the temperature is lowered to a level which is lower 5° to 20° C. than the saturation temperature and is left as it is for 30 minutes until it is stabilized.

Next, the (111) surface of the aforementioned G.G.G. substrate is placed at a level higher about 1 cm than the level of the molten solution and is preheated for about 15 minutes. After that, the aforementioned G.G.G. substrate is dipped in the molten liquid such that its (111) surface is positioned 1 cm below the liquid level, and is rotated at 30 to 100 rpm so that it may epitaxially grow.

After a desired thickness growth is obtained, the substrate is taken out of the molten liquid and is rotated at about 400 rpm thereby to remove the undesired molten liquid wetting.

The magnetic garnet film usable according to the present invention can use a variety of thicknesses for the magnetic bubble memory element, but in the usual case the film thickness is set at a value about one half or equal to the diameter of the magnetic bubbles.

If the magnetic garnet film according to the present invention is used, the magnetic bubbles having a remarkably small diameter can be formed and stably held, and the high operating characteristics can be attained. Although the diameter of the bubbles can be varied by varying the film thickness, the thickness of the garnet film for the magnetic bubble memory element is about 10 to 0.3 μm, and the most preferable result as the garnet film for the fine bubbles can be attained for the film thickness of about 2.5 to 0.3 μm.

What is claimed is:

1. A garnet film on a substrate, for a magnetic bubble element, said garnet film having such a composition as is expressed by a general formula of $(LaLu)_{3-x-y}Sm_xGd_yFe_{5-z}Ga_zO_{12}$, wherein: $0.3 \leqq x \leqq 1.0$; $0.2 \leqq y \leqq 1.0$; and $0.0 \leqq z \leqq 0.8$, said substrate being a single-crystalline substrate of $Gd_3Ga_5O_{12}$, and said garnet film being epitaxially grown on the (111) surface of the single-crystalline substrate of $Gd_3Ga_5O_{12}$.

2. A garnet film on a substrate as set forth in claim 1, wherein said garnet film has a thickness of about 10 to 0.3 μm.

3. A garnet film on a substrate as set forth in claim 2, wherein the film thickness is 2.5–0.3 μm.

* * * * *